Oct. 20, 1970 F. M. MINKS 3,535,652
GATED TRANSISTOR BLOCKING OSCILLATOR WITHOUT FEEDBACK WINDING
Original Filed Oct. 4, 1965
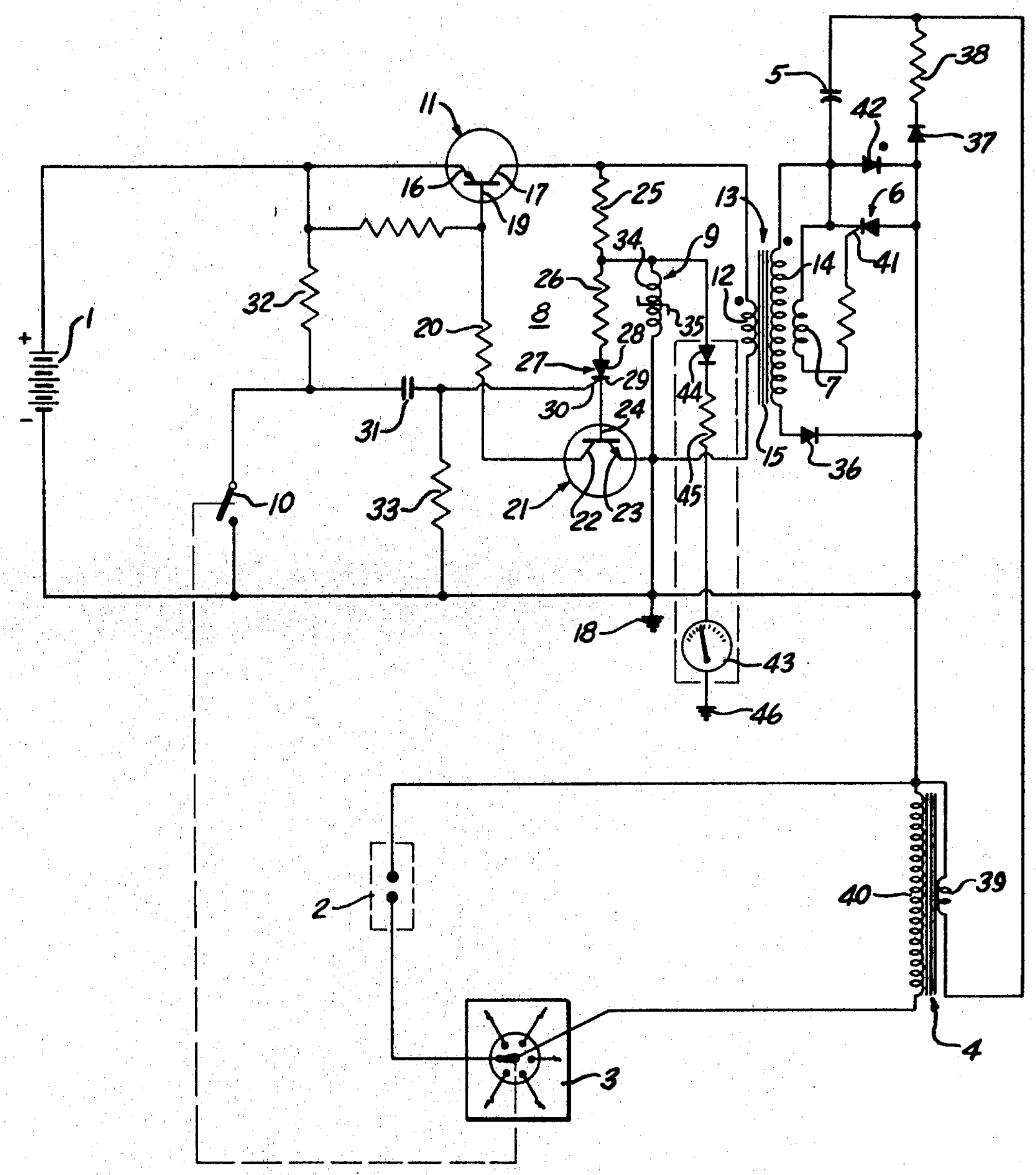
INVENTOR.
FLOYD M. MINKS
BY Andrus & Starke
ATTORNEYS United States Patent Office 3,535,652

Patented Oct. 20, 1970

3,535,652

GATED TRANSISTOR BLOCKING OSCILLATOR WITHOUT FEEDBACK WINDING

Floyd M. Minks, Kissimmee, Fla., assignor to Brunswick Corporation, Chicago, Ill., a corporation of Delaware Original application Oct. 4, 1965, Ser. No. 492,570. Divided and this application Apr. 10, 1968, Ser. No. 720,221

Int. Cl. H03k 3/28

U.S. Cl. 331—112 8 Claims

ABSTRACT OF THE DISCLOSURE

This disclosure relates to a blocking oscillator having a charging transistor connected in series with the primary of a transformer and a battery. A triggering and feedback circuit includes a control transistor connected in the base circuit of the main charging transistor with the input of the control transistor connected in series with a silicon controlled rectifier to the battery. The gate of the silicon controlled rectifier and the base of the control transistor are connected to a suitable signal source to provide periodic turn-on pulses to the silicon controlled rectifier and transistor. A square loop core unit is connected to divert current from the silicon controlled rectifier and the input of the control transistor. Consequently, when the circuit is first turned on, the current increases until such time as the square loop core unit is saturated. At that time, the reactance of the square loop core unit decreases diverting the current around the silicon controlled rectifier and control transistor and effectively turning them off.

This invention relates to a blocking oscillator and is a division of application Ser. No. 492,570 filed on Oct. 4, 1965 entitled Controlled Electrical Pulse Source.

Electronic ignition systems for internal-combustion engines have been suggested for a number of years wherein a capacitor is charged from the battery and/or the generator and is rapidly discharged through the induction coil of the usual ignition unit to fire a spark plug. The recent development of solid state devices such as transistors, silicon controlled rectifiers and the like provided a highly satisfactory amplifying and switching means for controlled charging and switching of the capacitor circuit. A highly satisfactory capacitor discharge ignition system is shown in applicant's copending application entitled Capacitor Ignition System which was filed on Mar. 1, 1965 with Ser. No. 436,118, and now U.S. Pat. No. 3,369,151.

Generally, in accordance with the present invention, a triggered blocking oscillator of an improved and novel construction is provided having a control circuit connected in the feedback circuit to determine the time that each pulse begins and the energy per pulse. In a preferred construction, a transistor is connected in series with the primary of an oscillator transformer means. Timed switching means are provided for periodically initiating conduction through the transistor to provide a pulse from the battery or other direct current (D.C.) source to the transformer primary. The switching means is connected in a feedback loop control having a magnetic core unit connected in the circuit to permit conduction of said switch means until the core of the unit is saturated at which time the rapid change in the permeability of the core unit causes a diversion of current and turn-off of the transistor. The core unit may advantageously employ a square loop type core material; that is, one with essentially a rectangular magnetic characteristic. The transistor rapidly turns off causing a decay in the flux in the transformer. At this time, the transformer provides an output pulse charging the capacitor which is subsequently discharged to the ignition spark plug or other ignition unit of the interal-combustion engine.

In a preferred construction of the present invention, the triggering and the feedback circuit employs a control transistor connected in the base circuit of the main charging control transistor with the input of the control transistor connected in circuit through a silicon controlled rectifier or the like. The gate of the silicon controlled rectifier and the base of the control transistor are connected to a suitable signal source to provide periodic turn-on pulses to the silicon controlled rectifier and transistor. The square loop core unit is connected to divert current from the silicon controlled rectifier and the input of the control transistor. Consequently, when the circuit is first turned on, the current increases until such time as the square loop core unit is saturated. At that time, the reactance of the square loop core unit decreases diverting the current around the silicon controlled rectifier and control transistor and effectively turning them off. This, in turn, turns off the main transistor and provides the pulse transfer as noted above. Thus, the conduction is initiated by the turn-on pulse and terminated by the magnetic energy regulator. The unit therefore acts as a gated or triggered oscillator and not as an amplifier of the input pulse.

The present invention thus provides a highly efficient means for regulating the energy per pulse. The circuit of the present invention provides a desired output over a wide variation in the input.

The drawing furnished herewith illustrates a preferred construction of the present invention in which the above advantages and features are clearly disclosed as well as others which will be clear from the following description of the drawing.

The drawing is a schematic circuit diagram of an ignition system employing a blocking oscillator constructed in accordance with the present invention.

Referring to the drawing, the illustrated ignition system is connected to a direct current source such as a low voltage battery 1 having a suitable rated output voltage such as 6, 12 or 24 volts all of which are presently employed in automobiles, trucks, outboard motors or other similar internal-combustion engines. A single spark gap 2 is illustrated forming a part of a combustion chamber of the prime mover. In multi-cylinder engines, a plurality of spark gaps will normally be employed with a distributor 3, shown in block diagram, provided to sequentially distribute the power to the several gaps in accordance with known practice. The illustrated embodiment of the present invention employs a pulse transformer 4 which couples the spark gap 2 to a capacitor discharge circuit including a storage capacitor 5 connected to be discharged through the transformer 4 in series with a silicon controlled rectifier 6. A firing control transformer winding 7 is connected to the rectifier 6 and provides controlled firing thereof in timed relation to the operation of the internal-combustion engine and the distributor 3 as hereinafter described and thereby causes proper transfer of energy from the capacitor 5 to gap 2.

The capacitor 5 is connected to be charged from the battery 1 through a triggered blocking oscillator 8 which includes a square loop core unit 9 to regulate the energy per pulse as hereinafter described.

An input switch 10 is coupled to be actuated in synchronism with the operation of the engine, diagrammatically shown coupled to the operation of the distributor 3, to provide periodic triggering of the blocking oscillator 8 into conduction.

The oscillator 8 generally includes a charging transistor 11 connected in series with a primary 12 of a transfer or oscillating transformer 13. A secondary 14 of transformer 13 is connected in a charging circuit with the capacitor 5, as hereinafter described. The circuit is such that during the conduction through the primary 12 from the battery 1, the capacitor circuit 5 is effectively opened. When the current through the transformer primary 12 is cut off, a pulse is generated in the secondary which is conducted to charge the capacitor 5. This charge is transmitted to the gap 2 as noted above at the initiation of the subsequent charging of the transformer 13.

Generally, the circuit operation includes the opening of the switch 10 to initiate operation of the oscillator 8 which derives power from the battery 1 with a portion of the current passing through the square loop core unit 9. When the square loop core unit is saturated however, it will rapidly turn off the oscillator 8 and the collapsing field in transformer 13 produces a current in the secondary 14 which charges capacitor 5 to a corresponding level. The square loop core unit 9 determines the on time of the oscillator 8 as a function of the battery voltage and therefore regulates the energy in the pulse transferred to the capacitor 5. The silicon controlled rectifier 6 is fired therefore by a pulse generated in winding 7, which is wound as a part of transformer 13, during the initial conduction of oscillator 8 and in timed relation to the operation of the distributor 3 and the movement of the piston, not shown, to provide proper transfer of energy from the capacitor 5 through the pulse transformer 4 to gap 2.

More particularly in the illustrated embodiment of the invention, the oscillator circuit includes the transistor 11, shown as a PNP type, connected in a common emitter configuration, having an emitter 16, as an input-output element, connected to the positive side of the battery 1 and a collector 17, as an output element, connected to one side of the primary winding 12. The opposite side of the transformer primary winding 12 is connected to the negative side of the battery 1 through a common ground connection 18. The transistor 11 includes a base 19 as the input element which is connected to derive its power from the battery 1 as follows. The base 19 is connected to the negative terminal of the battery 1 through a dropping resistor 20 and a transistor 21 to ground which controls the turning on or conduction through the transistor 11.

The transistor 21 is shown as an NPN type having the collector connected through resistor 20 to the base 19 and the emitter 23 connected to the ground terminal 18. An input base 24 of the transistor 21 is connected to derive power from the collector 17 of transistor 11 after initiation of the triggering of the blocking oscillator 8. The connection to the collector 17 is through a resistor 25, a resistor 26 and a silicon controlled rectifier 27 to provide a selectively completed or triggered voltage dividing network. Thus, the feedback winding commonly used in blocking oscillators is eliminated. A feedback winding could be used; for example, if other conditions necessitated the grounding of collector 17 of transistor 11.

The silicon controlled rectifier 27 includes an anode 28 connected to the adjacent series resistor 26 and the cathode 29 connected to the base 24 of transistor 21. A gate 30 of the silicon controlled rectifier 27 controls conduction through the rectifier from the anode 28 to the cathode 29. The gate 30 is connected to the positive side of the battery 1 through a direct current blocking capacitor 31 and the resistor 32. Switch 10 is connected between the negative side of battery 1 and the junction of capacitor 31 and resistor 32. Thus, whenever switch 10 is open, a circuit is momentarily completed from the positive side of the battery through the resistor 32. capacitor 31, gate 30 and cathode 29 to the base 24 of transistor 21 and then through the emitter 23 to the negative side of the battery 1 and ground 18. Consequently, the silicon controlled rectifier 27 and transistor 21 will be biased to conduct and permit current to flow and provide an input bias on the transistor which in turn provides an input signal on the base 19 of transistor 11. Regenerative action to the base 24 of the transistor 21 causes it to conduct at a greater rate. The current will thus increase through the transistors 11 and 21 and the series connected transformer primary 12 with the energy being stored in the core 15. The square loop core unit 9 is connected to cut off conduction.

When the switch 10 again closes, capacitor 31 discharges through resistor 33.

The illustrated pulse forming circuit including switch 10 has been shown for purposes of clearly illustrating the functioning of the oscillator and may be replaced with any other appropriate timing means adapted to generate a short duration pulse.

The core unit 9 may be of any known or suitable construction and is diagrammatically shown including a winding 34 wound on a square loop core 35. Thus, the inductance of winding 34 is relatively high until the knee of the core characteristic is reached and then rapidly changes to a relative very small value. Winding 34 is connected between the junction of resistors 25 and 26 and the emitter 23 of transistor 21 and thus directly across the circuit of the silicon controlled rectifier 27 and the input circuit of the transistor 21. When transistor 11 begins to conduct a part of the current is diverted through the winding 34 of square loop core unit 9 which provides a relatively high impedance to the current flow until it reaches saturation. When it changes to the saturated condition, the reactance reduces substantially and essentially to zero and provides a direct bypass or shunt around the silicon controlled rectifier 27 and the input circuit of the transistor 21. The silicon controlled rectifier 27 and the transistor 21 stop conducting and the bias on the base 19 of the transistor 11 is removed. This opens the circuit from the battery 1 to stop the input current flow. The voltage dividing resistors 25 and 26 are provided to insure reset of the unit 9 and to prevent excessive current in the circuit when unit 9 is saturated.

The core unit 9 thus acts as a switch sensitive to the volt-time integral applied to it. In the broadest aspect of the present invention, other switch means including semiconductors connected to be turned on by either the volt-time integral applied or by the current through winding 12 of transformer 13, which is proportional to the volt-time integral, can be employed to regulate the energy in each cycle or single pulse generated by the oscillator.

When the core unit 9 terminates conduction, the magnetic field in the core 15 of the transformer 13 collapses and induces a voltage of opposite polarity in the secondary winding 14 to cause a current flow through the capacitor charging circuit which includes a blocking diode 36, a protective diode 37 and a resistor 38 connected to the positive side of the capacitor 5. The opposite side of the capacitor 5 is connected to the opposite side of the transformer secondary 14. This will permit charging of the capacitor to the selected value determined by the cutoff of the oscillator 8 through the action of the square loop core 9.

The capacitor 5 subsequently discharges through transformer 4 by triggering the silicon controlled rectifier 6.

Transformer 4 includes a primary 39 connected in series with the silicon controlled receifier 6 directly across the capacitor 5. The illustrated transformer 4 includes a secondary 40 connected across the spark plug 2 in series with the distributor 3.

The silicon controlled rectifier 6 generally corresponds to the rectifier 27 and includes a gate 41 connected to the trigger winding 7 which is wound as a small secondary on the oscillator transformer 13. Winding 7 is wound with respect to the primary 12 to provide a trigger pulse during the starting cycle of the oscillator 8. Consequently, when the switch 10 is opened to initiate operation of the oscillator 8, the transformer winding 7 produces a firing pulse which causes rectifier 6 to conduct and discharge the previous charge on the capacitor 5 through the pulse transformer 4 for firing of the spark gap 2.

Generally, in accordance with the teaching of applicant's previously identified copending application, a Zener diode 42 is connected in parallel with the silicon controlled rectifier as a protective device.

The operation of the illustrated embodiment of the invention may be briefly summarized as follows:

The switch 10 is coupled to the distributor 3 to be driven in accordance with the movement of the pistons of the internal-combustion engine in accordance with any suitable or known system. The battery 1 provides a source of energy to the oscillator 8 which is transferred to the capacitor 5 to charge it to a selected level whenever the switch 10 is opened to initiate conduction through a gate circuit of silicon controlled rectifier 27 and the input or base loop of transistor 21. The transistor 11 then conducts and provides a charging current until the square loop core unit 9 is saturated at which time it rapidly turns the oscillator off, terminating the charging of the transformer 13 and transferring a charging pulse to the capacitor 5.

The next time the switch 10 is opened the charging cycle is again initiated. The winding 7 fires the silicon controlled rectifier 6 and completes the discharge circuit for the capacitor 5 through the pulse transformer 4. The capacitor 5 is therefore rapidly discharged through the pulse transformer to fire the proper spark gap 2 or the like during the charging of the transformer 13. The capacitor 5 cannot discharge back to the transformer 13 as a result of the blocking diode 36.

The present invention provides a unique blocking oscillator employing a controlled rectifier connected in the input circuit of the transistor or similar electronic switch means to initiate conduction. The controlled rectifier may be connected directly in circuit with the main oscillator transistor 11 with the gate circuit in series with the input elements of the transistor. Further, the preferred circuit employing the two transistors provides a unique circuit for driving the oscillator with power derived directly from the battery or other input power source.

The present invention thus provides an improved blocking oscillator which provides a highly efficient means for controlling the charging of a capacitor 5 to a preselected level and maintains essentially predetermined constant operation independently of the level of the voltage source over a wide variation in the voltage level thereof as well as the operating speed of the engine over the ranges selected and determined by the particular value of the several components in the system. This energy level is primarily dependent upon the characteristics of the core unit 9 and transformer 13 and to a slight extent the resistors 25 and 26 and is essentially independent of the exact value of the switching element parameters of the oscillator such as gain of the transistor and the exact value of the capacitor 5.

A meter 43, diode 44 and resistor 45 are connected between a ground 46 and the top side of the element 34 to define a tachometer as more fully described in the previously identified parent patent application of which this application is a division.

For purposes of the present invention, a blocking oscillator includes an inductive energy storage means connected to an energy source through a switch means having at least one input means connected to derive power in a feedback loop from the output and the storage means is connected in an output circuit to deliver the stored energy upon the decrease of current into the inductive energy storage means.

I claim:

1. A blocking oscillator, comprising an inductive storage means, an energy source connection means, a main transistor having an input element, an output element and a common input-output element, the output element and the common input-output element being connected in a series circuit loop with the storage means and the energy source connection means for supplying of energy to said storage means, a control transistor having an input element, an output element and a common input-output element, the output element and the common input-output element of the control transistor being connected in a series control loop with the input element and the common input-output element of the main transistor and the energy source connection means to maintain conduction during a cycle of the blocking oscillator, means to connect the input element of the control transistor to the output element of the main transistor to establish an input circuit and to derive a control signal from the main transistor for sustaining a cycle of the blocking oscillator, and means connected to said control transistor to initiate a cycle of the blocking oscillator.

2. The blocking oscillator of claim 1 wherein the said last named means includes a controlled rectifier connected in series between the input element of the control transistor and the output element of the main transistor and having an input gate and means to selectively apply a signal to said gate to bias said rectifier to conduct and impress a turn-on signal to said control transistor.

3. The blocking oscillator of claim 2 having a turn-off means responsive to a characteristic of the power output and connected across the controlled rectifier and the input circuit of the control transistor to turn off the oscillator.

4. A blocking oscillator, comprising an input power supply means, an inductive energy storage means, an electronic switch means for selectively supplying power from said supply means to said storage means, said electronic switch means having a terminal means adapted to control conduction through the electronic switch means, a controlled rectifier means connected in a series circuit with said terminal means and said input power supply means to supply turn-on power to said electronic switch means and having a signal power input means, and signal means connected to the signal power input means of the rectifier means to actuate the controlled rectifier and supply power through said series circuit to said switch means to cause said switch means to conduct and initiate operation of a single cycle of the blocking oscillator.

5. The blocking oscillator of claim 4 wherein the electronic switch means includes a transistor connected in a common emitter circuit connection and the controlled rectifier is connected in the base loop of the transistor for controlling the current flow through the storage means and the signal means are connected to simultaneously excite the input means of the controlled rectifier and the base of the transistor to initiate a pulse of the blocking oscillator.

6. A blocking oscillator, comprising an inductive energy storage means, an electronic switch means, a power circuit including said storage means and switch means connected in series to a power source means for selectively supplying power to said storage means, said electronic switch means having an input means adapted to control conduction through the electronic switch means, a control transistor connected in a series circuit loop with the input means of the electronic switch means and an input power connection means to control the flow of current to the input means, said control transistor having signal input means, feedback means coupling the output of the electronic switch means to the signal input means of the control transistor to maintain conduction of said control transistor, said feedback means including a saturable control element to turn off the control transistor after a predetermined current flow, and means connected to said control transistor to bias said transistor on to initiate conduction of said control transistor.

7. A blocking oscillator, comprising an inductive storage means for connection to an energy source input means, a transistor means connected to control the connection of the storage means to the input means and having a pair of input elements connected in an input circuit, a controlled rectifier connected in series with said elements in said input circuit and having a gate, and input signal means connected to the gate and to one of said input elements to simultaneously bias and energize the transistor means and the controlled rectifier to turn on said transistor means and said rectifier to initiate a pulse of the blocking oscillator.

8. The blocking oscillator of claim 3 wherein said turn-off means is a saturable magnetic turn-off means having a winding means connected across said controlled rectifier and the input circuit of the control transistor.

References Cited

UNITED STATES PATENTS

| | | | |
|---|---|---|---|
| 3,158,751 | 11/1964 | Nelson | 331—112 X |
| 3,206,694 | 9/1965 | Bates | 331—111 X |

ROY LAKE, Primary Examiner

S. H. GRIMM, Assistant Examiner

U.S. Cl. X.R.

307—275; 315—209; 331—149, 174